US009120237B2

(12) United States Patent
Staines

(10) Patent No.: US 9,120,237 B2
(45) Date of Patent: Sep. 1, 2015

(54) KNIFE BLADE LIGHT

(76) Inventor: Stephen J Staines, Perth (CA)

( * ) Notice: Subject to any disclaimer, the term of this patent is extended or adjusted under 35 U.S.C. 154(b) by 0 days.

(21) Appl. No.: 13/353,378

(22) Filed: Jan. 19, 2012

(65) Prior Publication Data

US 2013/0188337 A1 Jul. 25, 2013

(51) Int. Cl.

| | |
|---|---|
| ***B25B 23/18*** | (2006.01) |
| ***F21L 4/00*** | (2006.01) |
| ***H04M 1/22*** | (2006.01) |
| ***F21L 13/00*** | (2006.01) |
| ***F21V 33/00*** | (2006.01) |
| ***F21V 21/00*** | (2006.01) |
| ***F21V 21/08*** | (2006.01) |
| ***H01R 33/00*** | (2006.01) |
| ***H01R 13/58*** | (2006.01) |
| ***H01R 4/38*** | (2006.01) |
| ***H01R 31/08*** | (2006.01) |
| ***H01H 9/06*** | (2006.01) |
| ***B26B 11/00*** | (2006.01) |

(52) U.S. Cl.
CPC ........... *B26B 11/008* (2013.01); *F21V 33/0084* (2013.01); *B25B 23/18* (2013.01); *B26B 11/00* (2013.01)

(58) Field of Classification Search
CPC ...... B26B 11/00; B26B 11/008; B25B 23/18; B25F 5/021; F21V 33/0084; B25G 1/085
USPC ......... 362/119, 120, 190, 191, 183, 253, 102, 362/205, 208, 375, 382, 396, 430, 647; 30/123, 142–164; 439/100, 144, 147, 439/363, 464, 471, 775, 776, 799, 832; 200/238, 239, 262, 43.04, 43.05, 329, 200/332.2, 254
See application file for complete search history.

(56) References Cited

U.S. PATENT DOCUMENTS

| | | | | |
|---|---|---|---|---|
| 1,890,841 | A * | 12/1932 | Brown | 362/119 |
| 5,845,986 | A * | 12/1998 | Breen | 362/119 |
| 6,749,318 | B1 * | 6/2004 | Palacios | 362/119 |
| 7,008,077 | B2 * | 3/2006 | Raichlen | 362/120 |
| 7,306,366 | B1 * | 12/2007 | Camenzind et al. | 374/141 |
| 8,550,516 | B2 * | 10/2013 | Best | 294/59 |
| 2004/0141313 | A1 * | 7/2004 | Elsener | 362/119 |
| 2011/0249426 | A1 * | 10/2011 | Chen | 362/119 |
| 2011/0289780 | A1 * | 12/2011 | Tiegs | 30/123 |

* cited by examiner

*Primary Examiner* — Ismael Negron
*Assistant Examiner* — William N Harris

(57) ABSTRACT

A device for illuminating on or about an axial shaft of a tool and the work area used with the tool. In particular, the device is releasably secured to the axial shaft of the tool and upon contact therewith causes the device to illuminate parallel to the axis of the shaft and work area.

13 Claims, 5 Drawing Sheets

KNIFE BLADE LIGHT

TECHNICAL FIELD

The present invention relates to a device for illuminating on or about an axial shaft of a tool and the work area used therefore. In particular, the device is releasably secured to the axial shaft of the tool and upon contact therewith causes the device to illuminate parallel to the axis of the shaft and work area.

BACKGROUND OF THE INVENTION

Viewing a work area in conditions with minimal light is difficult at the best of times and can be made even more difficult due to a shadow zone effect projected onto the work area.

A typical situation where the aforementioned problem can be found is encountered when hunters hold a light in one hand while working their knife in the other hand or having someone else hold a light on the work area in these types of situations shadow zones develop adding to the problem of difficult working conditions. It is known in the art that a knife or work tool can have a torch compartment in or on the handle which when activated shines a light on either the tool/knife blade and/or the work area, unfortunately the torches and adapters therefore are integral to the torch which at the best of times complicates the handling of the tool and doesn't provide the feel good factor when using a commonly owned tool or for that matter a favorite tool that lacks the dimension to accommodate for existing torches.

A typical example of the aforesaid exists with hunters and tradesmen alike wanting to use their favorite knives or tools and don't have the built in light source or their tools/knives are of inadequate dimensions to accommodate adapters for holding the light source in place. The aforementioned problems are enhanced as any attempt to fix a light source to the favorite tool/knife would inevitably interfere with the end users feel and grip of that tool or knife.

There is, therefore, a need in the art for a device to accommodate a variety of tools for effective use in working conditions requiring illumination and to provide a solution for the other aforementioned problems.

SUMMARY OF THE INVENTION

The invention relates to a device for a tool, for example a knife, featuring a device for contacting and illuminating on or about an axial shaft of a tool and the work area used therefore. In particular, the device is releasably secured to the axial shaft of the tool and upon contact therewith causes the device to illuminate the shaft and work area. Accordingly, the present invention has been developed in response to a need in the art not yet been fully solved by existing tools, in particular reference to recreational and non-recreational tools used in areas where poor lighting or shadow zones exist.

An aspect of the present invention provides for a device for contacting and illuminating about a shaft of a tool and a work area used therefore. The device includes a body having an open base portion and a flexible strap extending upwardly from the open portion of the base with releasable securing means at an end portion of the strap for securing with a portion of the body. In an embodiment, the open base portion of the body is semi-rigid. The flexible strap encompasses a part of the body which includes a power source, contact points and at least one illuminating component. Positive and negative leads connect from the power source and the contact points to the at least one illuminating component.

The contact points include electrical conductive material for contacting the shaft of the tool and completing a closed circuit for activating the at least one illuminating component. The conductive material is metallic.

The illuminating component is chosen from a variety of light sources selected from recreational and non-recreational lights. In particular, the illuminating component is a light emitting diode having at least one lens and at least one reflector or is a light bulb and is arranged in a predetermined arrangement about the body of the device. In one embodiment the at least one illuminating component is an infrared light emitting diode.

In a further embodiment, the power source is an energy storage device that stores energy in a chemical reaction, for example, a battery.

The releasable securing means comprise at least one fastener made from natural material, synthetic material or a combination thereof. In an embodiment, the fastener can be Velcro®, magnets, resealable adhesive, elastic, at least one button or stud fastener or a combination of these features. The dimensions of the device can be preconfigured to accommodate a variety of hand-held tools selected from a group of recreational and non-recreational knives including other hand-held tools. Preferably, the variety of hand-held tools is selected from a hunting knives, divers knives, fillet knives, utility knives and screw drivers.

Another aspect of the present invention provides for a method for illuminating on or about an axial shaft of a tool and a work area used therefore including the steps of contacting the tool shaft with a body portion of a device for closing an electrical circuit for illuminating the shaft; and folding an upwardly extending strap from the body over a top portion of the shaft for releasably securing the strap about the shaft of the tool to the body portion of the device.

The body portion of the device is in an open configuration for receiving the shaft of a tool; and upon contact therewith for illuminating the shaft of the tool. After using the tool, the strap is disengaged from the body of the device for releasing the device from the tool and opening an electrical circuit.

In an embodiment, the device contacts a metallic area of the preferred tool of a knife shaft adjacent the handle and the device illuminates the blade portion of the knife.

A further aspect of the present invention provides for a kit of parts for assembly of the device of the present invention including the body having a semi-rigid open base portion and a flexible strap extending upwardly from the open portion of the base; releasable securing means at an end portion of the strap for securing with a portion of the body selected from a wide variety of fasteners.

Another embodiment of the invention provides for the at least one illuminating component comprising a light emitting diode of various colours. In another embodiment, the positive and negative leads connecting the power source to the lights are integral to the strap leading to the power source and illumination components.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, some of the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter. Accordingly, as one of skill in the art would appreciate the features applied in the present invention are not limited to the features provided by the present invention as other optional features are available.

BRIEF DESCRIPTION OF THE DRAWINGS

In order for the advantages of the invention to be readily understood, a more particular description of the invention briefly described above will be rendered by reference to specific embodiments that are illustrated in the appended drawings.

Understanding that these drawings depict only typical embodiments of the invention and are not therefore to be considered to be limiting of its scope, the invention will be described and explained with additional specificity and detail through the use of the accompanying drawings, in which.

Figure 1:
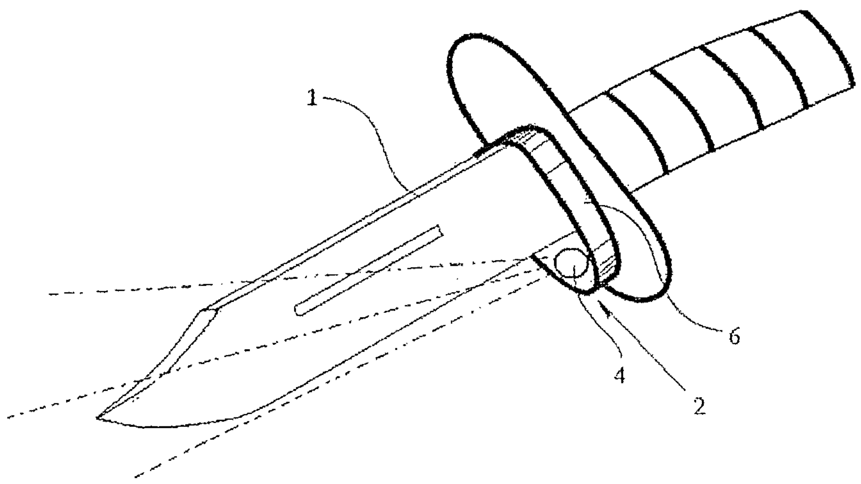
FIG. 1. shows a perspective view of a knife with the device of the present invention.

These features and advantages of the present invention will become more apparent from the following description and appended claims, or may be learned by the practice of the invention as set forth hereinafter.

DETAILED DESCRIPTION

Although preferred embodiments of the present invention have been described, it will be understood by those skilled in the art that the present invention should not be limited to the described preferred embodiments. Rather, various changes and modifications can be made within the spirit and scope of the present invention, as defined by the following claims.

For the purposes of promoting an understanding of the principles of the invention, reference will now be made to the exemplary embodiments illustrated in the drawings, and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention.

Reference throughout this specification "one embodiment," "an embodiment," or similar language means that a particular feature, structure, or characteristic described in connection with the embodiment is included in at least one embodiment of the present invention. Thus, appearances of the phrases "one embodiment,"; "an embodiment," and similar language throughout this specification may, but do not necessarily, all refer to the same embodiment, different embodiments, or component parts of the same or different illustrated invention. Additionally, reference to the wording "an embodiment," or the like, for two or more features, elements, etc. does not mean that the features are related, dissimilar, the same, etc. The use of the term "an embodiment," or similar wording, is merely a convenient phrase to indicate optional features, which may or may not be part of the invention as claimed.

Each statement of an embodiment is to be considered independent of any other statement of an embodiment despite any use of similar or identical language characterizing each embodiment. Therefore, where one embodiment is identified as "another embodiment," the identified embodiment is independent of any other embodiments characterized by the language "another embodiment.". The independent embodiments are considered to be able to be combined in whole or in part one with another as the claims and/or art may direct, either directly or indirectly, implicitly or explicitly. The fact that the wording "an embodiment," or the like, does not appear at the beginning of every sentence in the specification, such as is the practice of some practitioners, is merely a convenience for the reader's clarity. However, it is the intention of this application to incorporate by reference the phrasing "an embodiment," and the like, at the beginning of every sentence herein where logically possible and appropriate. As used herein, "comprising," "including," "containing," "is, are," and grammatical equivalents thereof are inclusive or open-ended terms that do not exclude additional un-recited elements or method steps.

In reference to the figures, FIG. 1, represents a use of an embodiment of the invention showing the device 2 attached to a tool shaft 1, for example a knife, featuring the device contacting and illuminating on or about an axial shaft of the tool and the work area (not shown) used therefore. In particular, the device is releasably secured to the axial shaft of the tool and upon contact therewith causes the device to illuminate the shaft and work area.

Figure 2:
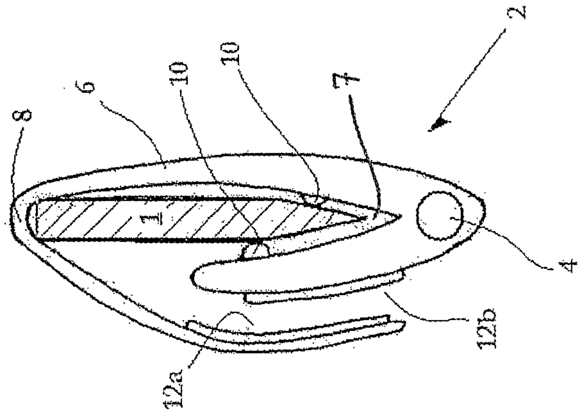
FIGS. 2, 3 and 4. show side views of variations of the device of the present invention engaged with a knife blade.
Figure 3:
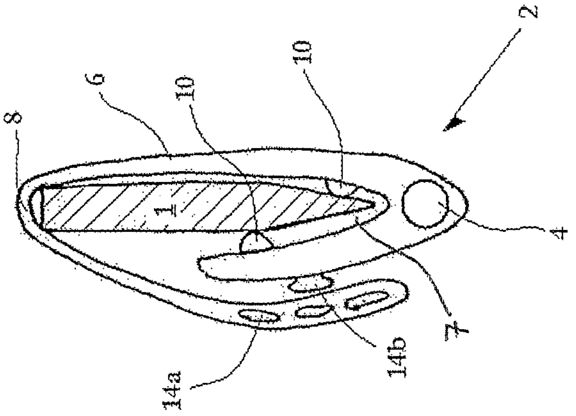
Figure 4:
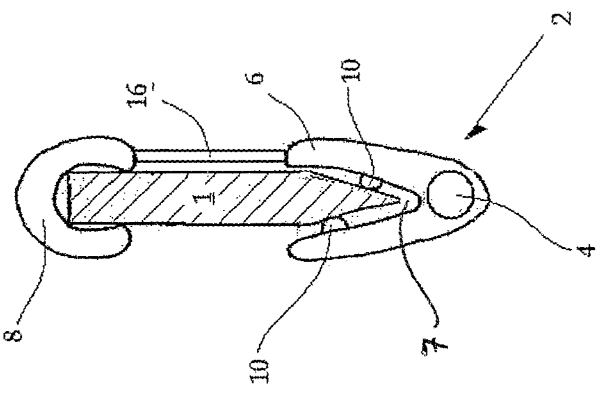
Figure 6:
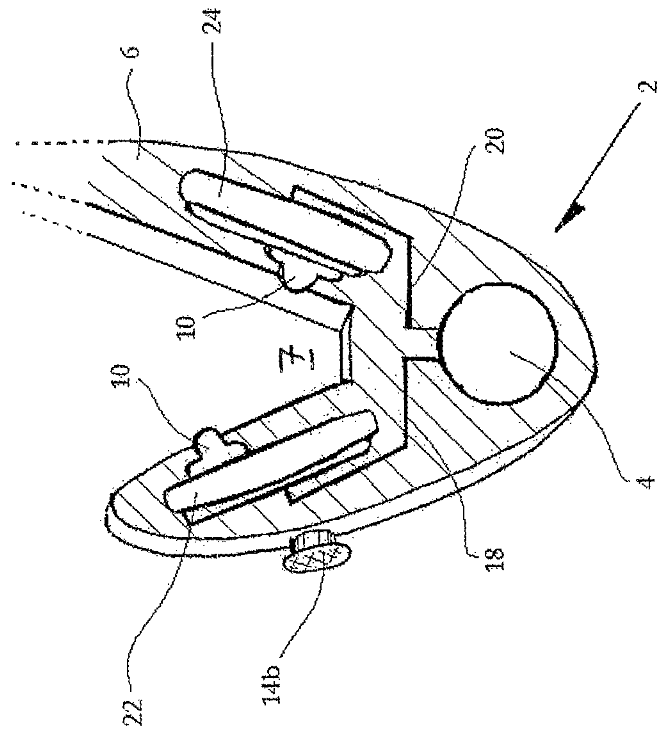
FIG. 6. is an exploded, perspective and partial cross-sectional view of FIG. 5.
Figure 5:
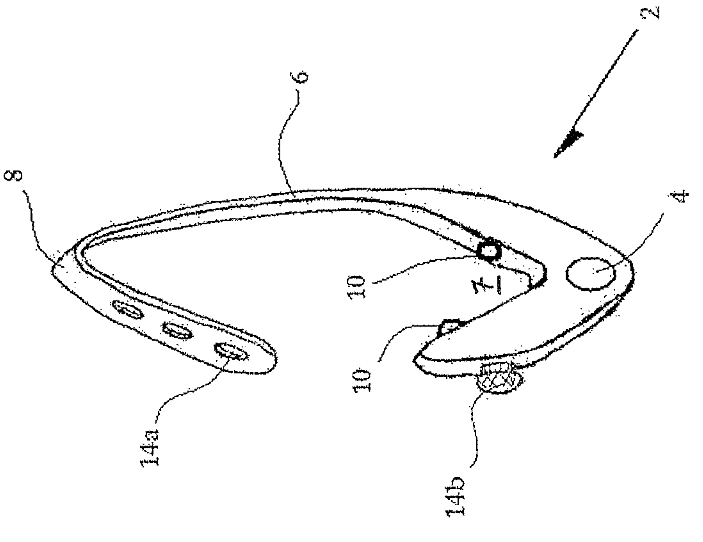
FIG. 5. show a perspective view of FIG. 3 without the blade.
Figure 11:
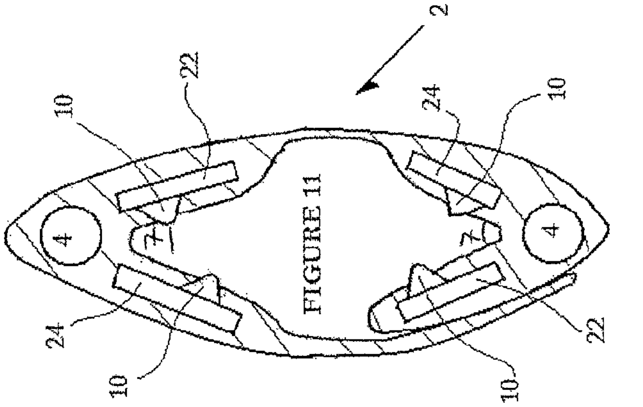
FIG. 11. shows a cross-sectional view of an alternative form of the device.
Figure 8:
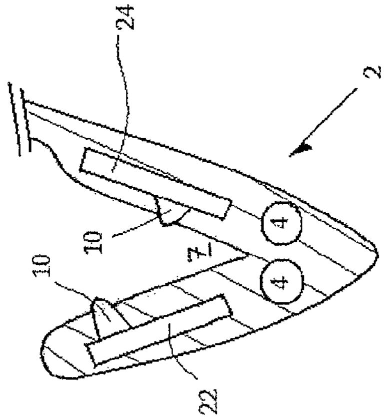
FIGS. 7, 8, 9 and 10 show partial cross-sectional views of variations of the present invention.
Figure 10:
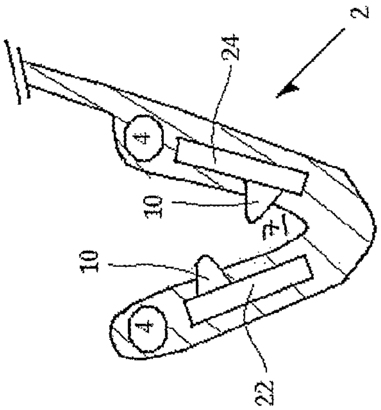
Figure 7:
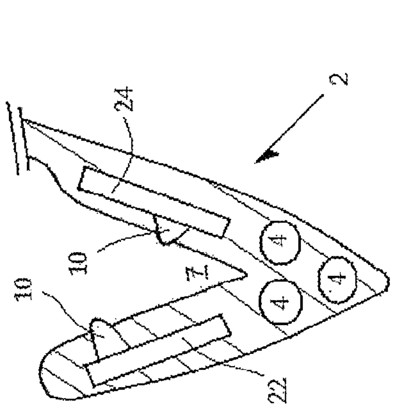
Figure 9:
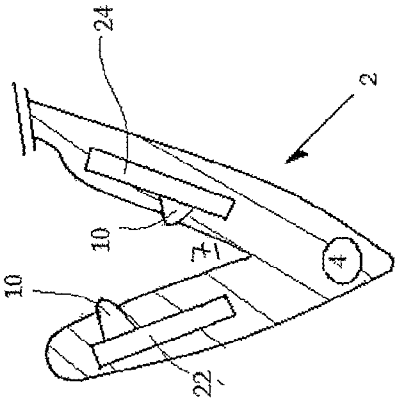

Looking to FIGS. 2, 3 and 4, in one embodiment the device 2 includes a body 6 having an open base portion 7 and a flexible strap 8 extending upwardly from the open portion of the 7 with releasable securing means 12*a*, 12*b*, 14*a* and 14*b* (hereinafter numbered as 12/14) at an end portion of the strap 8 for securing with a portion of the body 6. The strap 8 encompasses a part of the body 6 which includes a power source 22 and 24, contact points 10 and at least one illuminating component 4. Positive 18 and negative leads 20 connect from the power source 22, 24 to the at least one illuminating component 4.

Contact points 10 include electrical conductive material for contacting the shaft 1 of the tool and completing a closed circuit for activating the at least one illuminating component 4. The conductive material is metallic.

The illuminating component 4 can be chosen from a variety of light sources selected from recreational and non-recreational lights. An embodiment of the present invention provides for the illuminating component 4 being a light emitting diode having at least one lens and at least one reflector or is a light bulb and is preferably arranged in a predetermined arrangement about the body 6 of the device 2.

The power source 22, 24 includes at least one energy storage device. In an embodiment of the present invention the energy storage device stores energy in a chemical reaction, for example, a battery or as an non-chemical alternative at least one ultra-capacitor used alone or in combination with batteries as the energy storage device 2.

Figure 14:
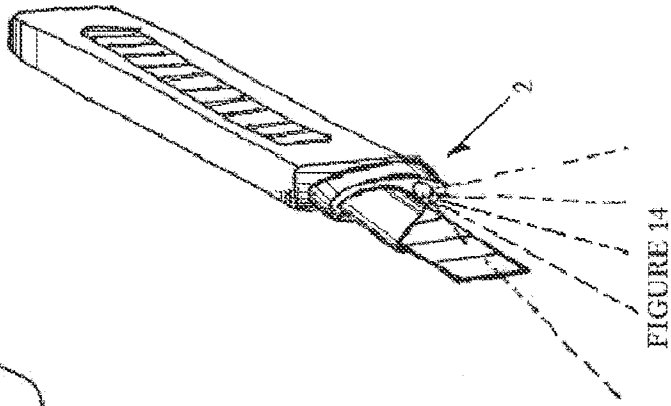
FIGS. 12, 13 and 14. show alternative uses of device on a variation of knives.
Figure 13:
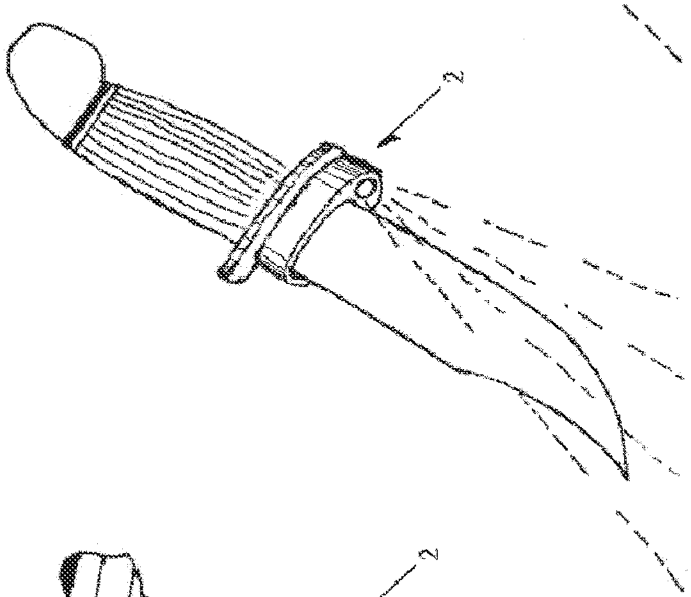
Figure 12:
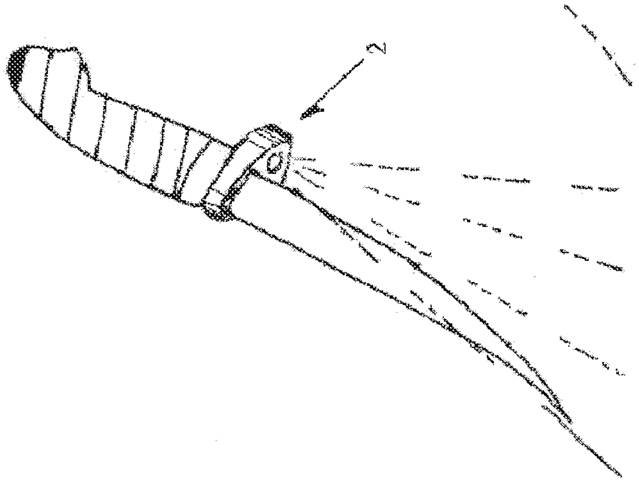

The releasable securing means 12/14 comprise at least one fastener. In an embodiment, the fastener is Velcro®, elastic, magnets, at least one button or stud fastener or a combination of these features. The dimensions of the device 2 can be preconfigured to accommodate a variety of hand-held tools selected from a group of recreational and non-recreational knives and mechanical hand-held tools. Preferably, the variety of hand-held tools is selected from a hunting knives, fillet knives, utility knives (refer to FIGS. 12, 13 and 14) and screw drivers. In an embodiment and with reference to FIG. 4 an elastic 16 can be used as a form of strap to pull over the top portion of the tool shaft without further engaging the body portion of the base. The nature of the elastic tension forces the top portion of the device on to the top of the tool shaft for holding it in place.

Another aspect of the present invention provides for a method for illuminating on or about an axial shaft 1 of a tool and a work area used therefore including the steps of contacting the tool shaft 1 with a body portion 6 of a device 2 for closing an electrical circuit 18/20 for illuminating the shaft 1; and folding the upwardly extending strap 8 from the body 6 over a top portion of the shaft 1 for releasably securing the strap 8 about the shaft 1 of the tool to the body portion 6 of the device 2.

The body portion 6 of the device 2 is in an open configuration for receiving the shaft 1 of a tool; and upon contact therewith for illuminating the shaft 1 of the tool. After using the tool, the strap 8 is disengaged from the body 6 of the device 2 for releasing the device 2 from the tool and opening an electrical circuit 18/20. In a further embodiment, the contacts 10 of device 2 engage a metallic area of the selected tool, for example, the shaft 1 of a knife, adjacent the handle in which the device 2 illuminates the blade portion of the knife (refer to FIG. 1).

A further aspect of the present invention provides for a kit of parts for assembly of the device 2 of the present invention including the body 6 having a semi-rigid open base portion 7 and a flexible strap 8 extending upwardly from the open portion of the base; releasable securing means at an end portion of the strap for securing with a portion of the body 6 selected from a wide variety of fasteners 12/14. The kit can be assembled using a variation of the parts to fit with the specific use.

An alternative power source can be selected from at least one lithium-battery, an ultra-capacitor, a solar powered fuel cell or a combination thereof. Preferably the solar cells are positioned in the strap portion of the device. More preferably, the power source are batteries 22/24 located in the body 6 portion of the base.

A preferred illuminating component is the light emitting diode having various wavelengths and subsequent colours. More preferably, the light emitting diode has at least one lens and at least one reflector made of plastic and glass or combinations of the two.

In an embodiment the positive and negative leads connecting the power source to the illuminating component are preferably integral to the strap.

Preferred metal contact points are selected from a variety of options including single points, wire mesh, metal strips, single or multiple bare wires or combinations thereof. More preferably the contact points are metal tabs of a predetermined dimension to accommodate for the shape of the tool shaft. In another embodiment and with reference to FIGS. 7, 8, 9, 10 and 11 the at least one illuminating component can be positioned in and around the body of the device in a predetermined configuration to best fit conditions the device is used in or the type of tool the device is used on.

While the present invention has been fully described above with particularity and detail in connection with what is presently deemed to be the most practical and preferred embodiment of the invention, it will be apparent to those of ordinary skill in the art that numerous modifications, including, but not limited to, variations in size, materials, shape, form, function and manner of operation, assembly and use may be made, without departing from the principles and concepts of the invention as set forth in the claims.

I claim:

1. A device for selected attachment to a metal blade of a knife for illuminating about the knife and about an area of use of the knife, comprising:

said knife having a blade with a sharpened side and a handle;

a body having an inverted V-shaped open base portion configured to accept the sharpened blade side of the knife adjacent the handle;

a flexible strap extending upwardly from one side of the open base portion and having fastening means for detachable connection to fastener means on an opposite side of the base portion;

said base portion having at least one power source, electrical contact points and at least one illumination component, the illumination component being adjacent a vertex of the V-shaped open base portion;

said open base portion further configured wherein when said strap is tightened around the blade to secure the device to said blade the contact points contact said metal blade, and the power source and the illumination component are placed in an electric circuit to provide illumination.

2. The device of claim 1, wherein the contact points have conductive material selected from single points, wire mesh, metal strips, single or multiple bare wires or combinations thereof.

3. The device of claim 1, wherein said contact points are on either side of the open base portion.

4. The device of claim 1, further comprising positive and negative leads connected from the power source and the contact points to the at least one illuminating component.

5. The device of claim 1, wherein the at least one illuminating component is a light emitting diode.

6. The device of claim 1, wherein the at least one illuminating component is an infrared light emitting diode.

7. The device of claim 5, wherein the light emitting diode comprises at least one lens and at least one reflector.

8. The device of claim 1, wherein the at least one illuminating component is a light bulb.

9. The device of claim 1, wherein the power source, is a battery.

10. The device of claim 1, wherein the flexible strap and base portion have co-operating fastening means wherein the fastening means is taken from the group consisting of VELCRO, elastic, magnets, resealable adhesive, at least one button or stud fastener or a combination thereof.

11. The device of claim 1, wherein dimensions of the device can be preconfigured to accommodate a variety of hand-held knives selected from a group consisting of recreational and non-recreational knives.

12. A method of illuminating a knife blade and an area of work about the blade, comprising:

(1) providing a device according to claim 1;

(2) contacting the open base portion of the device with the sharpened side of the knife blade;

(3) wrapping the flexible strap attached at one end to said open base portion about the knife blade and fastening the strap to the base portion causing the base portion to close the device around the knife blade and for causing an electrical contact between the contact points and the metal blade closing the electrical circuit.

13. The method of claim 12, wherein after using the knife, the strap is disengaged from the body portion of the device for re-opening the electrical circuit and removing the device from the knife.

* * * * *